US010274330B2

(12) United States Patent
Unger et al.

(10) Patent No.: US 10,274,330 B2
(45) Date of Patent: Apr. 30, 2019

(54) METHOD AND APPARATUS FOR PROVIDING A NAVIGATION ROUTE

(71) Applicant: HERE Global B.V., Veldhoven (NL)

(72) Inventors: Jens Unger, Berlin (DE); Giuseppe Tribulato, Berlin (DE)

(73) Assignee: HERE Global B.V., Veldhoven (NL)

( * ) Notice: Subject to any disclaimer, the term of this patent is extended or adjusted under 35 U.S.C. 154(b) by 106 days.

(21) Appl. No.: 14/585,947

(22) Filed: Dec. 30, 2014

(65) Prior Publication Data

US 2016/0187148 A1   Jun. 30, 2016

(51) Int. Cl.
*G01C 21/00* (2006.01)
*G01C 21/34* (2006.01)
*G01C 21/36* (2006.01)

(52) U.S. Cl.
CPC ..... *G01C 21/3461* (2013.01); *G01C 21/3423* (2013.01)

(58) Field of Classification Search
None
See application file for complete search history.

(56) References Cited

U.S. PATENT DOCUMENTS

| | | | | |
|---|---|---|---|---|
| 8,214,141 B2* | 7/2012 | Froeberg | | G01C 21/3461 701/400 |
| 9,217,647 B2* | 12/2015 | Pech | | G01C 21/3423 |
| 2001/0025222 A1* | 9/2001 | Bechtolsheim | .... | G01C 21/3423 701/410 |
| 2007/0005240 A1* | 1/2007 | Oumi | | G01C 21/3484 701/425 |
| 2009/0157311 A1* | 6/2009 | Seltzer | | G01C 21/3484 701/414 |
| 2010/0057347 A1* | 3/2010 | Sugiyama | | G01C 21/3611 701/465 |
| 2010/0268460 A1* | 10/2010 | Wan | | G01C 21/3415 701/414 |
| 2010/0312466 A1* | 12/2010 | Katzer | | G01C 21/3492 701/533 |
| 2013/0204527 A1* | 8/2013 | Schilling | | G01C 21/34 701/533 |
| 2014/0163872 A1* | 6/2014 | Schilling | | G01C 21/32 701/527 |

(Continued)

FOREIGN PATENT DOCUMENTS

| | | | | |
|---|---|---|---|---|
| WO | WO 2012129687 A1 | * | 10/2012 | ......... G01C 21/3446 |
| WO | WO 2014139821 A1 | * | 9/2014 | ......... G01C 21/3453 |

*Primary Examiner* — Thomas G Black
*Assistant Examiner* — Demetra R Smith-Stewart
(74) *Attorney, Agent, or Firm* — Ditthavong & Steiner, P.C.

(57) ABSTRACT

An approach is provided for determining weighting information for candidate navigation routes in a navigation program. A routing platform causes, at least in part, an application of at least one prize factor to one or more variables to evaluate one or more candidate routes. The routing platform determines weighting information for the one or more candidate navigation routes based, at least in part, on the application of the at least one prize factor to the one or more variables. The routing platform then causes, at least in part, a selection or a recommendation of at least on navigation route from among the one or more candidate navigation routes based, at least in part, on the weighting information.

21 Claims, 11 Drawing Sheets

(56) References Cited

U.S. PATENT DOCUMENTS

2015/0168149 A1* 6/2015 Graells .............. G01C 21/3423
701/527
2015/0345951 A1* 12/2015 Dutta ................. G01C 21/3605
701/400

\* cited by examiner

METHOD AND APPARATUS FOR PROVIDING A NAVIGATION ROUTE

BACKGROUND

Service providers are continually challenged to deliver value and convenience to consumers by, for example, providing compelling network services such as navigation routing services. For instance, service providers have been expanding the capabilities of navigation routing services from generating simple routes involving single modes of transports (e.g., driving, walking, etc.) to generating more complex routes involving multiple modes of transportation that span multiple connection or transfer points. One example of a more complex route is transit route that can involve walking in combination with multiple transfers among available transit lines (e.g., buses, subways, etc.). However, in this more complex routing scenario, service providers face significant technical challenges to resolving the multiple factors involved in determining or suggesting a navigation route.

SOME EXAMPLE EMBODIMENTS

Therefore, there is a need for an approach for determining a navigation route balances routing factors or variables to generate a navigation route that is more likely to be used by a consumer.

According to one embodiment, a method comprises causing, at least in part, an application of at least one prize factor to one or more variables used for evaluating one or more candidate navigation routes. The method also comprises determining weighting information for the one or more candidate navigation routes based, at least in part, on the application of the at least one prize factor to the one or more variables. The method further causes, at least in part, a selection, a recommendation, or a combination thereof of at least one navigation route from among the one or more candidate navigation routes based, at least in part, on the weighting information.

According to another embodiment, an apparatus comprises at least one processor, and at least one memory including computer program code for one or more computer programs, the at least one memory and the computer program code configured to, with the at least one processor, cause, at least in part, the apparatus to initiate an application of at least one prize factor to one or more variables used for evaluating one or more candidate navigation routes. The apparatus is also caused to determine weighting information for the one or more candidate navigation routes based, at least in part, on the application of the at least one prize factor to the one or more variables. The apparatus further causes, at least in part, a selection, a recommendation, or a combination thereof of at least one navigation route from among the one or more candidate navigation routes based, at least in part, on the weighting information.

According to another embodiment, a computer-readable storage medium carries one or more sequences of one or more instructions which, when executed by one or more processors, cause, at least in part, an apparatus to initiate an application of at least one prize factor to one or more variables used for evaluating one or more candidate navigation routes. The apparatus is also caused to determine weighting information for the one or more candidate navigation routes based, at least in part, on the application of the at least one prize factor to the one or more variables. The apparatus further causes, at least in part, a selection, a recommendation, or a combination thereof of at least one navigation route from among the one or more candidate navigation routes based, at least in part, on the weighting information.

According to another embodiment, an apparatus comprises means for causing, at least in part, an application of at least one prize factor to one or more variables used for evaluating one or more candidate navigation routes. The apparatus also comprises means for determining weighting information for the one or more candidate navigation routes based, at least in part, on the application of the at least one prize factor to the one or more variables. The apparatus further comprises means for causing, at least in part, a selection, a recommendation, or a combination thereof of at least one navigation route from among the one or more candidate navigation routes based, at least in part, on the weighting information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a navigation route are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
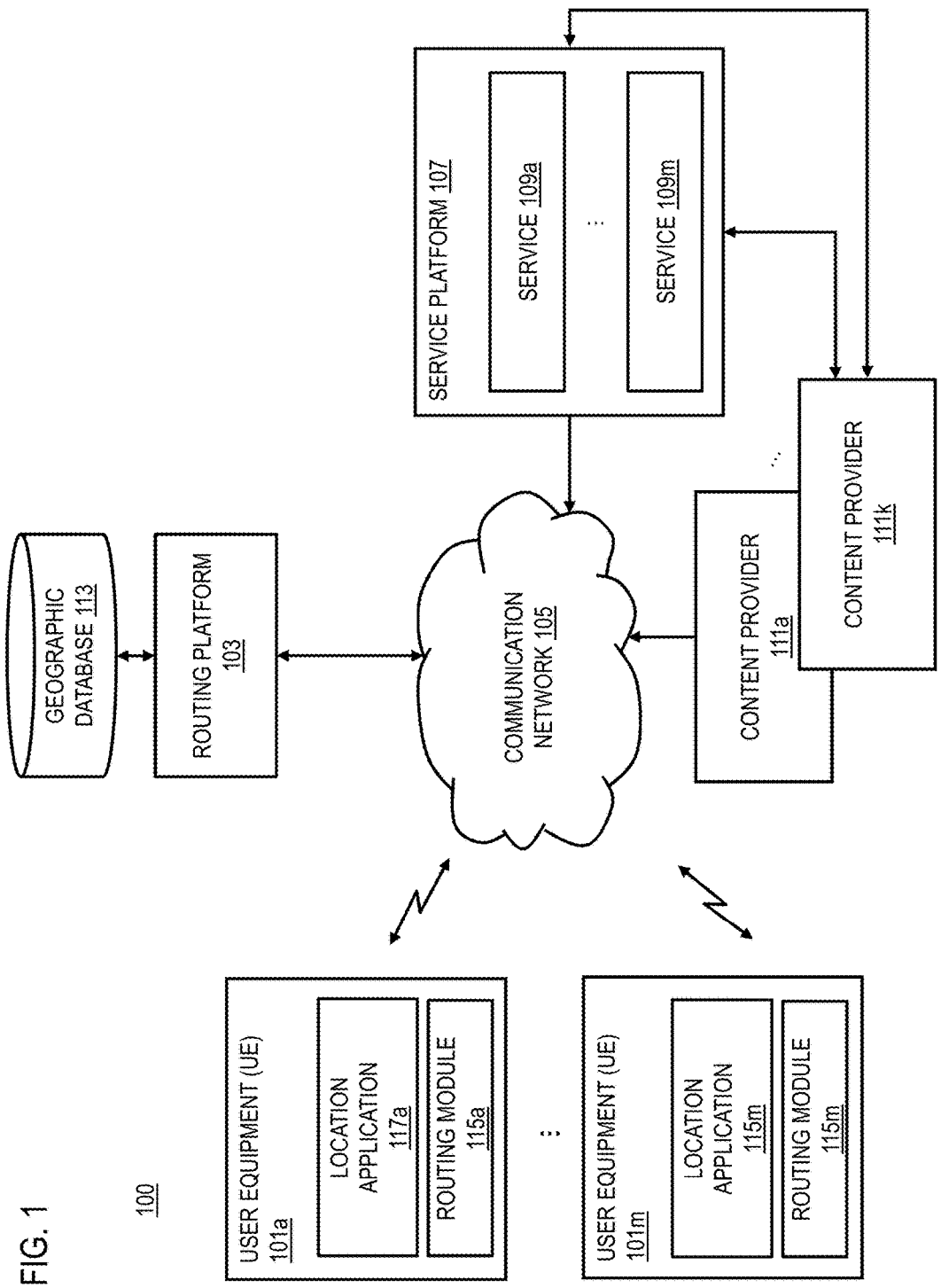
FIG. 1 is a diagram of a system capable of providing a navigation route, according to one embodiment.

FIG. 1 is a diagram of a system capable of providing a navigation route, according to one embodiment. As previously discussed, within an increasingly complex navigation environment with multiple connections, transfers, modes of transport, etc., it is becoming increasingly difficult to calculate or determine navigation routes that are likely to be chosen by users. For example, by default, many navigation routing algorithms or services recommend routs based on the fastest or shortest route from getting from point A to point B. However, the fastest or shortest route is sometimes not what many users would consider a "good" or "best" route. Whether is considered "good" by a user, for instance, can often be measured by whether a user actually uses a route suggested by the algorithm.

For example, at least in the context of transit navigation routes, the fastest routes often involve more transfer or connections than slower ones. However, many users do not like making transfers even if a route may be faster. Users, for example, may believe that up to a 15 minute increase in trip duration (e.g., depending on total trip duration) can be an acceptable compromise if additional transfers can be avoided. This desire to avoid transfers are often manifested in the experience of transit users that take buses or other forms of public transport that may not be reliable or predictable, thereby possible additional risk of delays of interruptions on each transfer.

To address this problem, a system 100 of FIG. 1 introduces a capability to predict or determine a "good" route (e.g., a route that is likely to be chosen by a user) by establishing rules for evaluating candidate routes. In one embodiment, the system 100 follows one or more of the following rules: (1) for the first and/or last "mile" of a route (e.g., a first or last segment of the route), the system 100 selects and/or recommends routes that avoid short rides (e.g., especially bus rides), and/or provide a walk (or other alternative) option to the next hub or interchange of the route; and (2) If there is an alternative route with less transfers and with a still acceptable trip duration, the alternative route will be assigned a higher relevance value (e.g., priority) with respect to the user.

More generally, in one embodiment, the system 100 enables the above scenario by introducing the application of a "prize factor" to variables of a routing scheme that are likely to be favored by a typical user (e.g., a transit user). In the above example, for instance, relevant variables may include (but are not limited to) time of arrival, trip duration, and number of transfers. In one embodiment, the "prize factor" represents any means for increasing or positively affecting a weight or relevance of a particular variable in determining whether a route is to be selected for or recommended to a user.

In one embodiment, in the context of the second rule discussed above, the system 100 can implement a process to provide a "good" route. In one embodiment, this process includes assigning a weight to candidate routes that balances between the duration, the number of transfers, and the time of arrival. For example, a route can sometimes be very fast but starts late so that a user might not arrive at a desired time. In contrast, another candidate route might be longer but the user can start journey or route immediately and still arrive at the user's destination by a desired time of arrival. In one embodiment, all of these factors are taken into account for the weighting information calculation. Then, the candidate route can be selected or recommended based on the weighting information (e.g., highest or lowest weight depending on the way the weighting is performed).

In one embodiment, the weighting information is calculated as follows:

$$\text{weight} = \text{total\_duration} + (\text{\#transfers} * tp) - ((\text{total\_duration} - \text{duration})/dr)$$

In this example, the variables include total_duration (e.g., expressed in minutes), duration (e.g., expressed in minutes), and #transfers. More specifically, total_duration [minute] is the difference between the shortest connection departure time and this connection arrival time, duration [min] is the difference between the arrival time and departure time of this connection, and #transfers is the number of transfer in the connection.

The above example also includes a penalty factor (e.g., tp) and a prize factor (e.g., dr). In one embodiment, tp (e.g., expressed in minutes) is the transfer penalty. For example, every transfer will be penalized as the connection takes tp minutes longer. The transfer penalty is applied based, for instance, on a reasoning that fewer transfers are more convenient than increased in trip duration. In one embodiment, the tp can be set to a default value (e.g., 8 minutes) that can be configured based on real-time information, historical information, expert information, etc. In one embodiment, the tp value can be specified so that the penalty is more or less severe depending on user and/or service provider preferences. In some embodiment, the system 100 can apply machine learning to determine an appropriate tp that will result in navigation routes are most likely to be chosen by a user.

In one embodiment, the prize factor (dr) is expressed in minutes so that every dr minutes of late departure will recompense the candidate route by a default number of minutes (e.g., effectively weighing the candidate route so that it will be shorter by dr minutes). The prize factor dr is applied based, for instance, on a reasoning that short trips are more convenient that long trips that arrive almost at the same time. In one embodiment, like the transfer penalty, the short duration prize factor can be set to a default value that can be configured based real-time information, historical information, expert information, etc. The default value can be configured based, for instance, on calibrating the system 100 in navigation routes that users will likely chose. In one embodiment, the calibration can be performed manually or automatically (e.g., through machine learning).

As previously noted, the use of the three variables discussed above (e.g., time of arrival, duration, and number of transfers) is provided for illustration and not by way of limitation. It is contemplated that any number and/or types of variables may be configured or process for evaluating candidate routes. Additionally, the prize factor and/or the penalty factors may be applied on any of the variables (e.g., depending on what factors are valued by users when selecting routes). In some cases, variables that have previously been associated with penalty factors may be applied with prize factors depending on a desired or targeted result of the route weighting and evaluation process.

For example, in one embodiment, an additional variable associated with a walking option (or an option to take any other alternative mode of transport) may be introduced to the weighting process. In one embodiment, the weighting information for a walking option is determined as follows:

$$weight=duration*wp$$

In this example, the wp (e.g., expressed in minutes) is a weight factor that can evaluate the walking option against a public transport (PT) option. For example, if wp is set to a value of 1.2, the system 100 will consider the walking option as 20% worse than a similar PT option. Alternatively, setting the wp to a value of 0.8 makes the wp an effective prize factor with respect to the walking option by favoring the walking option. As previously discussed, the value of wp can be dependent on the mode of transport, and can be calibrated based on observed user behavior information (e.g., what routes are actually chosen by users) and/or other real-time and/or historical information on routing preferences and practices. It is noted that the walking option is provided only as an example and not as a limitation of additional variables to which a prize factor and/or a penalty factor can be applied to determine a "good" route according to the approached described in the various embodiments.

As shown in FIG. 1, the system 100 comprises one or more user equipment (UE) 101a-101m (also collectively referred to as UEs 101) having connectivity to a routing platform 103, via a communication network 105. The UEs 101 also have connectivity to a service platform 107 that includes one or more services 109a-109m (also collectivity referred to as services 109) for providing routing, mapping, navigation, and/or other location-based services. In one embodiment, the service platform 107 and/or services 109 interact with one or more content providers 111a-111k (also collectively referred to as content providers 111) to provide routing information, mapping information, and/or other related information to the location platform 103.

In one embodiment, the services 109 may provide routing engines for calculating candidate routes for weighting and/or evaluation by the system 100. For example, the services 109 may employ any type or number of routing engines and/or algorithms for determining candidate routes include, but not limited to, Open TripPlanner (e.g., a multi-modal trip planner supporting OpenStreetMap (OSM)), GraphHopper (e.g., a Java routing engine for road networks), BRouter (e.g., a bike routing engine), Atlas (e.g., a Java map and navigation application), Open Source Routing Machine, Routino, etc.

In one embodiment, the routing platform 103 performs the routing functions using the approaches of the various embodiments described herein. In one embodiment, the routing platform 103 weighs and evaluates candidate routes using the prize factor approach by taking the out of the routing engines (e.g., provided by the services 109) and evaluating them after the routes are generated. In addition or alternatively, the route weighting and evaluation approaches described herein can be implemented within the services 109 and/or the routing engines themselves.

By way of example, the routing platform 103 may exist independently or within a cloud computing and/or cloud storage platform. Moreover, the routing platform 103 can be configured to determine routing information on a batch basis or in real-time/substantially real-time. For example, to perform real-time analysis, the routing platform 103 can be configured in an edge computing architecture. In one embodiment, the routing platform 103 has connectivity to a geographic database 113 for accessing and/or storing data related to navigation route, weighing, and/or evaluation.

In one embodiment, the UEs 101a-101m may include or execute respective routing modules 115a-115m (also collectively referred to as routing module 115) and location applications 117a-117m (also collectively referred to as location applications 117). In one embodiment, the routing modules 115 can perform all or a portion of the functions of the routing platform 103 as a local component of the UE 101. In this way, the routing functions of the various embodiments described herein can be implemented locally at the device without network connectivity. In addition or alternatively, the location applications 113 (e.g., a navigation application, a mapping application, etc.) can also perform all or portion of the processes described in the various embodiments discussed herein.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a navigation unit (e.g., in-vehicle or standalone), a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

By way of example, the UEs 101, routing platform 103, routing modules 115, and location applications 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the routing module 115 and the routing platform 103 interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
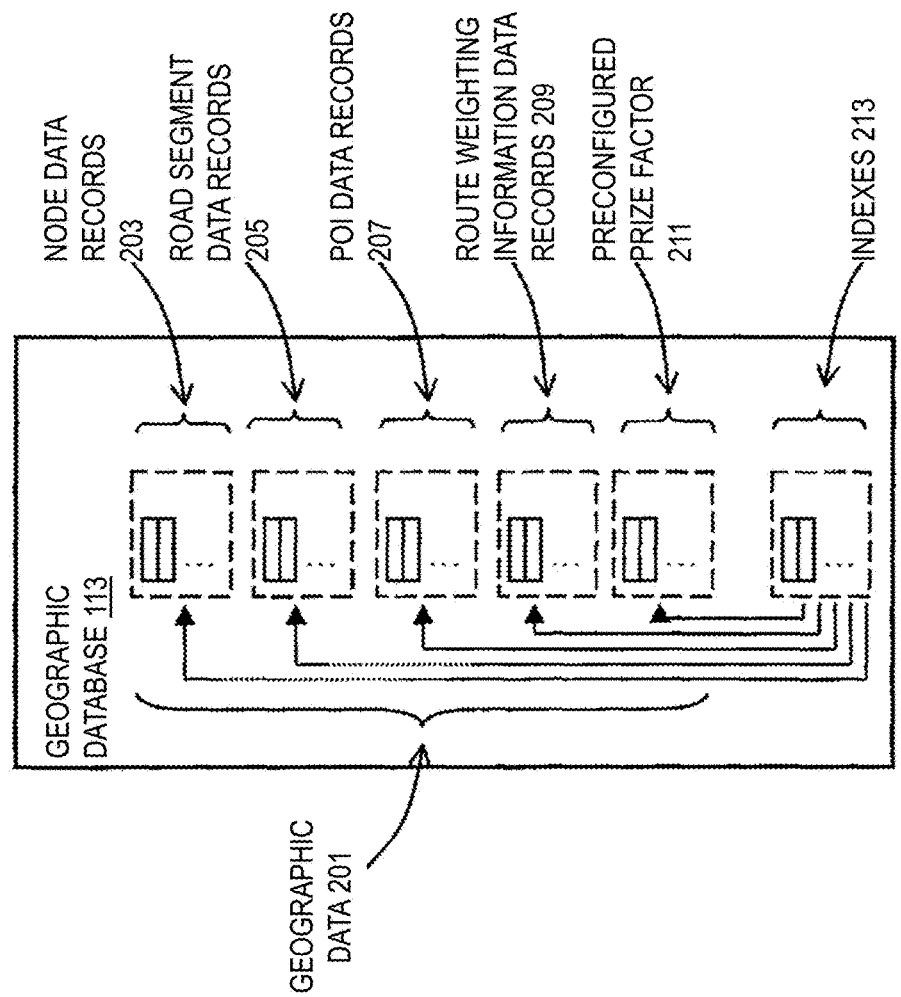
FIG. 2 is a diagram of a geographic database, according to one embodiment.

FIG. 2 is a diagram of a geographic database, according to one embodiment. In one embodiment, the trajectory paths and/or the probe data used for determining the trajectory paths through transportation structures may be stored, associated with, and/or linked to the geographic database 113 or data thereof. Although the geographic database 113 of FIG. 2 includes map data, it is contemplated that the various embodiments described herein may rely solely on the probe data and the waypoints associated with a transportation structure or interchange to determine trajectory paths through the structure. Therefore, in one embodiment, the components of the geographic database 115 related to map data are optional, and in some embodiments, not needed for the location platform 103 to determine trajectory paths.

As shown in FIG. 2, the geographic or map database 113 includes geographic data 201 used for (or configured to be compiled to be used for) navigation-related services. For example, the geographic database 115 includes node data records 203, road segment or link data records 205, POI data records 207, route weighting information data records 209, other data records 211, and indexes 213 to the geographic data 201. More, fewer, or different data records may be provided. In one embodiment, the other data records 211 include cartographic ("carto") data records, routing data, and maneuver data.

In one embodiment, the road segment data records 205 are links or segments representing roads, streets, or paths. The node data records 203 are end points corresponding to the respective links or segments of the road segment data records 205. The road link data records 205 and the node data records 203 represent a road network, such as used by vehicles, cars, and/or other entities. Alternatively, the geographic database 115 contains path segment and node data records or other data that represent pedestrian paths or areas in addition to or instead of the vehicle road record data.

The road/link segments and nodes may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 115 may include data about the POIs and their respective locations in the POI data records 207. The geographic database 119 may also include data about places, such as cities, towns, or other communities, and other geographic features, such as bodies of water, mountain ranges, etc. Such place or feature data may be part of the POI data 207 or may be associated with POIs or POI data 207 (such as a data point used for displaying or representing a position of a city). In addition, the geographic database 115 may include data about location-based events and their respective locations in the event data records 207. By way of example, the location-based events include any type of event that is associated with a particular location including, for instance, traffic, accidents, construction, public gatherings, etc.

In one embodiment, the geographic database 113 includes route weighting information data records 209 for providing route weighting and evaluation as described herein. For example, the route weighting information data records 209 may include data associated with the route variables being evaluated (e.g., trip duration, number of transfers, time of arrival, modes of transport, etc.). The route weighting information data records 209 may also store records related to the prize factors and/or penalty factors to apply to the variables. In yet another embodiment, the route weighting information data records 209 may store information related to user preferences, behaviors, route selection, contexts, etc. for providing route selection and/or recommendation as described herein.

The geographic database 113 may be maintained by the content provider 111 (e.g., a map developer). The map developer 111 collects geographic data to generate and enhance the database 115. There are different ways used by the map developer 111 to collect data. These ways include obtaining data from other sources, such as municipalities or respective geographic authorities. In addition, the map developer may employ field personnel to travel by vehicle along roads throughout the geographic region to observe features and/or record information about them. Also, remote sensing, such as aerial or satellite photography, may be used.

The geographic database 113 may be a master geographic database stored in a format that facilitates updating, maintenance, and development. For example, the master geographic database 113 or data in the master geographic database 113 is in an Oracle spatial format or other spatial format, such as for development or production purposes. The Oracle spatial format or development/production database may be compiled into a delivery format, such as a GDF format. The data in the production and/or delivery formats may be compiled or further compiled to form geographic database products or databases, which may be used in end user navigation devices or systems.

For example, geographic data is compiled (such as into a PSF format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

As mentioned above, the database 113 may be a master geographic database, but in alternate embodiments, the database may represent a compiled navigation database that may be used in or with end user devices (e.g., UEs 101) to provided navigation or map-related functions. For example, the database 113 may be used with the end user device 101 to provide an end user with navigation features. In such a case, the database may be downloaded or stored on the end user device 101, or the end user device 101 may access the database 113 through a wireless or wired connection (such as via a server and/or network 105).

In one embodiment, the end user device or UE 101 is an in-vehicle navigation system, a personal navigation device ("PND"), a portable navigation device, a cellular telephone, a mobile phone, a personal digital assistant ("PDA"), a watch, a camera, a computer, and/or other device that can perform navigation-related functions, such as digital routing and map display. In one embodiment, the navigation device 101 is a cellular telephone. An end user may use the device 101 for navigation functions such as guidance and map display.

Figure 3:
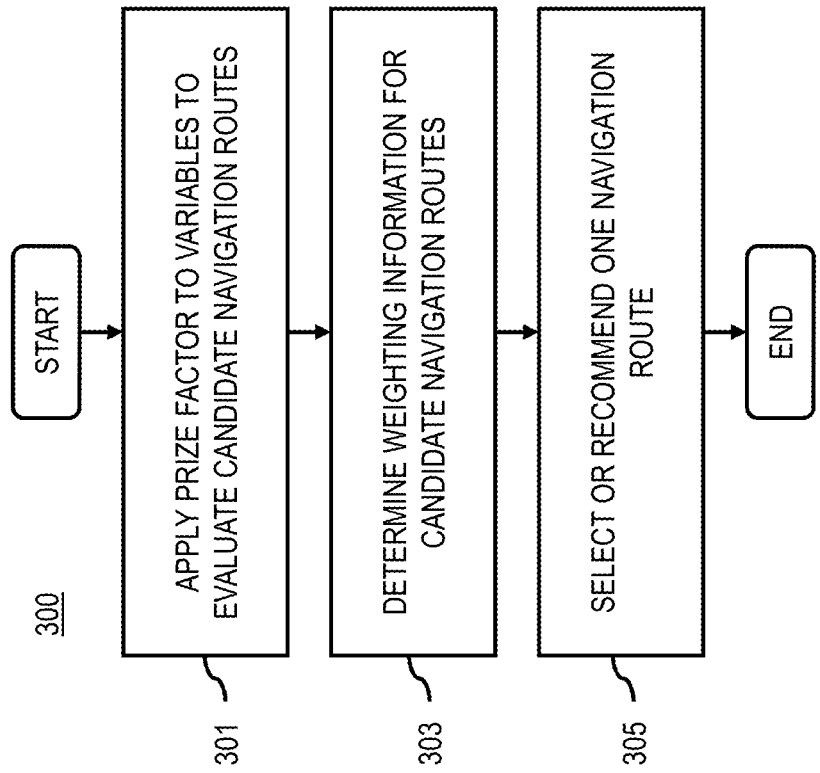
FIG. 3 is a flowchart of a process for providing route navigation based on a prize factor, according to one embodiment.
Figure 8:
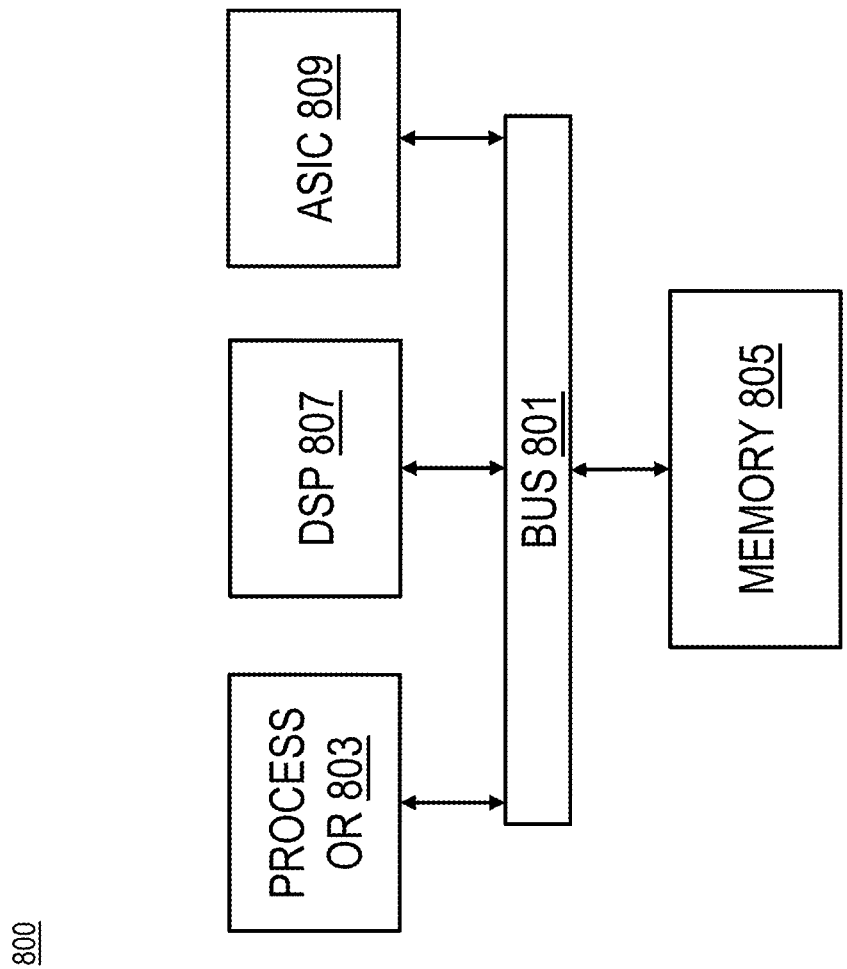
FIG. 8 is a diagram of a chip set that can be used to implement an embodiment of the invention.

FIG. 3 is a flowchart of a process for providing route navigation based on a prize factor, according to one embodiment. In one embodiment, the routing platform 103 performs the process 300 and is implemented in, for instance, a chip set including a processor and a memory as shown in FIG. 8. In addition or alternatively, the routing module 115 and/or the location application 117 can perform all or a portion of the process 300.

In step 301, the routing platform 103 causes, at least in part, an application of at least one prize factor to one or more variables used for evaluating one or more candidate navigation routes. In one embodiment, the one or more variables include, at least in part, a total duration variable that represents a time difference between a shortest connection departure time and an arrival time of a current connection; a duration variable that represents a time difference between an arrival time and a departure time of a current connection; a transfer variable that represents a number of transfers in the current connection; or a combination thereof. In one embodiment, the one or more candidate navigation routes, the at least one navigation route, or combination thereof include, at least in part, one or more public transit routes.

In one embodiment, the routing platform 103 balances the contributions of the one or more variables (e.g., trip duration, number of transfers, and time of arrival) by use of the prize factor. Accordingly, in step 303, the routing platform 103 determines weighting information for the one or more candidate navigation routes based, at least in part, on the application of the at least one prize factor to the one or more variables. In one embodiment, the routing platform 103 causes, at least in part, an application of the at least one prize factor to the duration variable.

As discussed previously, in one embodiment, the weighting information and application of the prize factor to the duration variable is provided for in the following example equation (e.g., the prize factor is applied as the parameter dr):

$$\text{weight} = \text{total\_duration} + (\#\text{transfers} * tp) - ((\text{total\_duration} - \text{duration})/dr)$$

In one embodiment, the routing platform 103 causes, at least in part, an application of at least one penalty factor to the transfer variable. The application of the penalty factor is shown as the parameter tp.

In one embodiment, the routing platform 103 determines a magnitude of the at least one prize factor and which of the one or more variables to apply the at least one prize factor based, at least in part, a balancing of a desired departure time, a desired trip duration, a desired arrival time, or a combination thereof. For example, the magnitude of the prize factor (e.g., a default value) can alter how much recompense (e.g., in turns of minutes) is applied to weighting information to favor trips of shorter duration.

In step 305, the routing platform 103 causes, at least in part, a selection, a recommendation, or a combination thereof of at least one navigation route from among the one or more candidate navigation routes based, at least in part, on the weighting information. For example, the routing platform 103 can apply any selection or recommendation criteria from picking from among the candidate routes. In one embodiment that uses the equation above, the route with the lowest weight is most likely to be selected by a user, and can therefore be selected or recommended by the routing platform 103.

Figure 4:
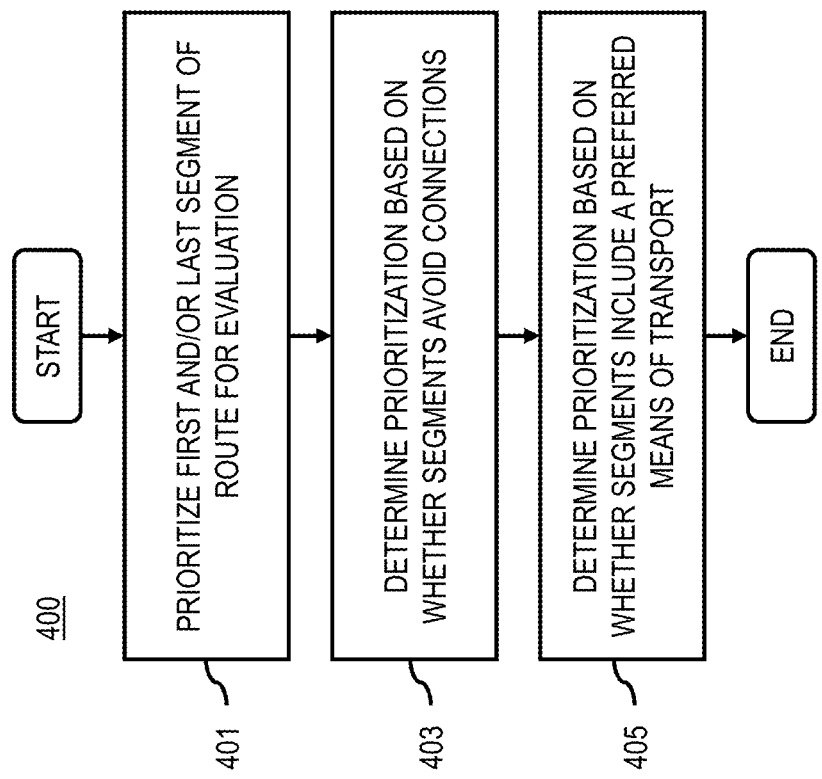
FIG. 4 is a flowchart of a process for prioritizing a first segment and a last segment of a route for evaluation, according to one embodiment.

FIG. 4 is a flowchart of a process for prioritizing a first segment and a last segment of a route for evaluation, according to one embodiment. In one embodiment, the routing platform 103 performs the process 400 and is implemented in, for instance, a chip set including a processor and a memory as shown in FIG. 8. In addition or alternatively, the routing module 115 and/or the location application 117 can perform all or a portion of the process 400.

In one embodiment, the process 400 of FIG. 4 is performed in combination with the process 300 of FIG. 4. The process 400, for instance, enables the routing platform 103 to differentially analyze and weight different segments of navigation route. In one embodiment, the routing platform 103 is configured to prioritize the "first and last mile" of a route for weighting. This prioritization is based, at least in part, on a reasoning that the travel during the first and/or last segments of a navigation route tend to have greater importance with respect to selection of a "good" route because the first and last segments often have the most and/or shortest potential number of transfers.

Accordingly, in step 401, the routing platform 103 causes, at least in part, a prioritization of the at least one first segment, at least one last segment, or a combination thereof of the one or more candidate navigation routes for evaluating the one or more candidate routes. In one embodiment, the first and/or last segments can be selected based on logical transfer or connection points. In another embodiment, the routing platform 103 can determine the first and/or last segments based on distance thresholds. By way of example, the distance thresholds can be absolute distance (e.g., first and last kilometer of the route) or relative distance (e.g., first and last 10% of the route).

Is step 403, the routing platform 103 determines the prioritization based, at least in part, on whether the at least one first segment, the at least one last segment, or a combination thereof avoid one or more connections of a duration based, at least in part, on a duration threshold value. In other words, the routing platform 103 will prioritize or favor segments that do not ask the user to wait a longer period of time waiting in between under the reasoning that users typically prefer be actually on a travel segment rather than waiting for a travel segment.

In step 405, the routing platform 103 determines the prioritization based, at least in part, on whether the at least one first segment, the at least one last segment, or a combination thereof include at least one user preferred means of transport or a means of transport to avoid. In one embodiment, the at least one user preferred means of transport or means of transport to avoid includes, at least part, a walking means of transport. In one embodiment, the routing platform 103 can apply either a prize factor or a penalty factor to any specified means of transport to either favor or avoid the means or mode of transport during route selection. Whether a means of transport is to be preferred or avoided can be based on the magnitude of the prize factor of the penalty factor.

Figure 5:
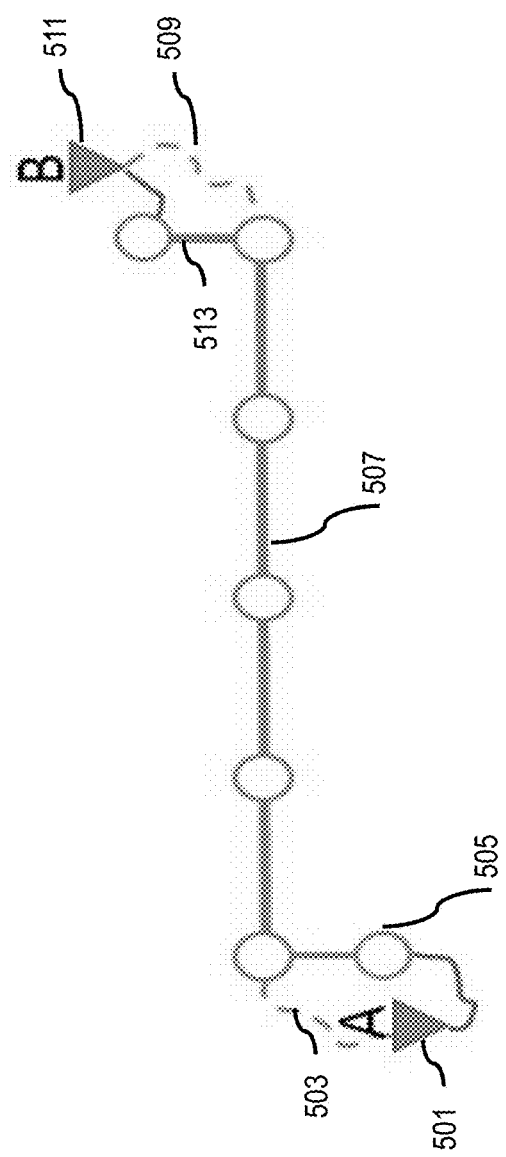
FIG. 5 is diagram illustrating example candidate routes for evaluation, according to one embodiment.

FIG. 5 is diagram illustrating example candidate routes for evaluation, according to one embodiment. As discussed before, transit users prefer less transfers, insofar as the longer duration of spent on the trip is acceptable. In one embodiment, for example, based on the experience of transit users, from the starting point 501, users prefer the route of first walking segment 503 than the route of public transport 505 through transfers, when the longer duration spent on the walking segment 503 is acceptable. In another embodiment, after the transit users passed through the same middle trip 507, transit users prefer to take the last walking segment 509 to the destination 511, rather than to take the transit route 513. It is contemplated that the effect of such preferred means of transport is considered in the weighting information formula, and the best route the program recommend will include consideration of the preferred means of transport, from the experience of users.

Figure 6A:
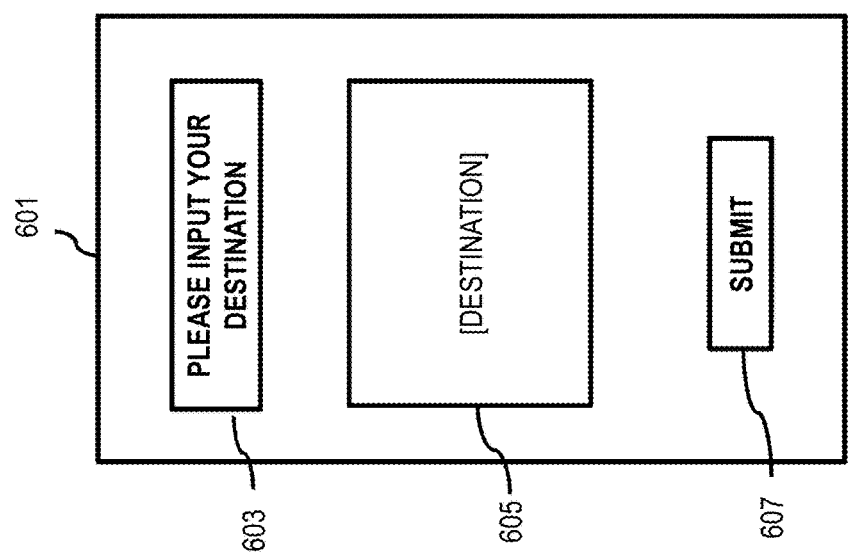
FIGS. 6A-6C are diagrams of user interfaces utilized in the processes of FIGS. 1-5, according to various embodiments.
Figure 6B:
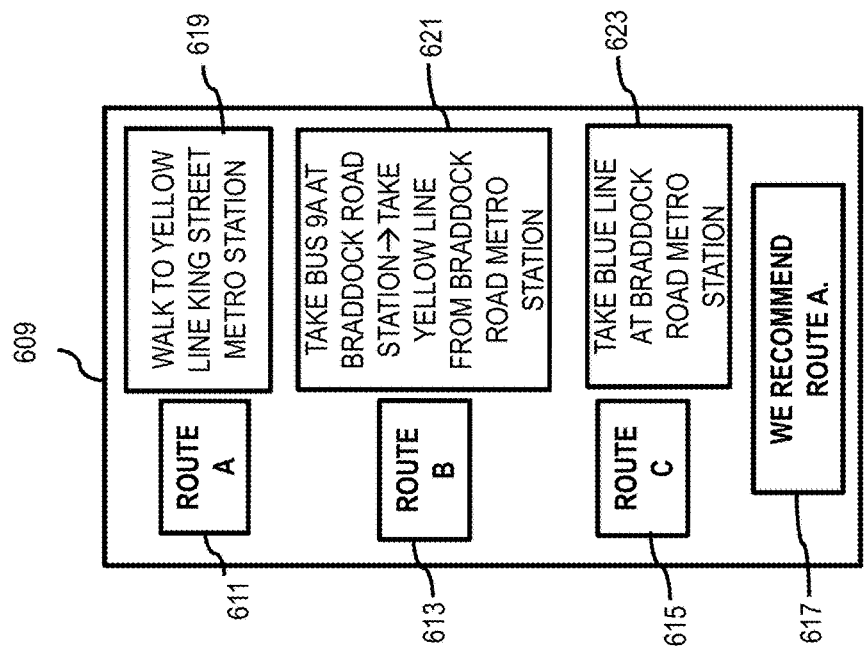
Figure 6C:
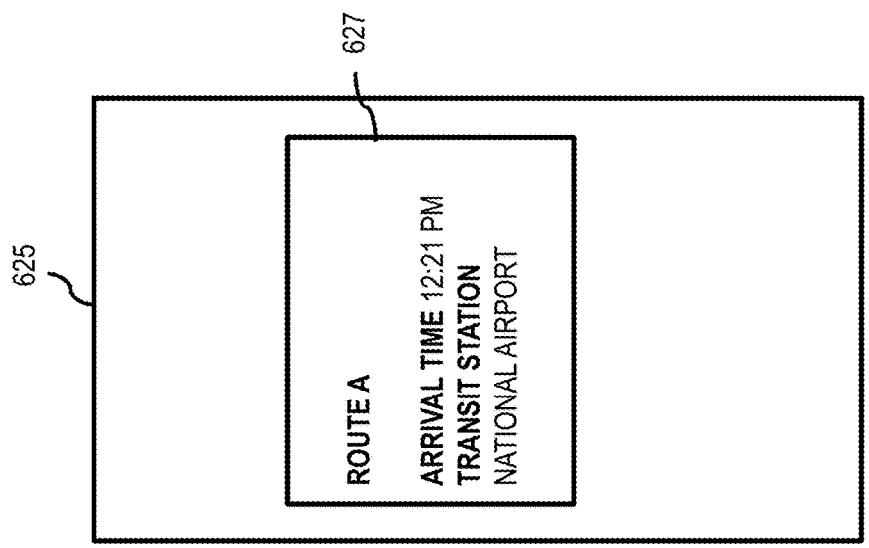

FIGS. 6A-6C are diagrams of user interfaces utilized in the processes of FIGS. 1-5, according to various embodiments. As shown in user interface 601 of FIG. 6A, user will be asked via a message 803 to input at least one destination of the trip. The destination input can be provided in a destination input area 805. The user can submit the destination by selecting the submit option 807 for processing by the routing platform 103.

After the application of prize factor to the evaluation and weighting variables, and determination of the weighting information (e.g., according to the processes discussed previously), a user interface 609 of FIG. 6B is presented. As shown, the user interface 609 presents several candidate routes (e.g., candidate route A 611, candidate route B 613, and candidate route C 615. The routing platform 103 also selects or recommends a best route, which balances the arrival time, duration and the number of transfers for presentation in the user interface 609 using the approaches of the various embodiments described herein.

In this example, the selected or recommended route is candidate route A 611, wherein route A 611 is a route directing transit users to walk to a Yellow Line train at the King Street Metro Station, and then commute therefrom. In comparison, route B 613 directs transit users need to take Bus 9A at the Braddock Road Station then take the Yellow Line train from Braddock Road Metro Station to the set destination, while route C 615 directs transit users to take the Blue Line train at the Braddock Road Metro Station and commute therefrom.

In one embodiment, the system 100 can also present a user interface 625 of FIG. 6C to provides information on why route A 611 is recommended in a window 627. For example, route A 611 is recommended because the arrival time is 12:21 in the afternoon, and the transit station is National Airport avoids excess transfers and prefers shorter wait times in between connections.

The processes described herein for providing a navigation route may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
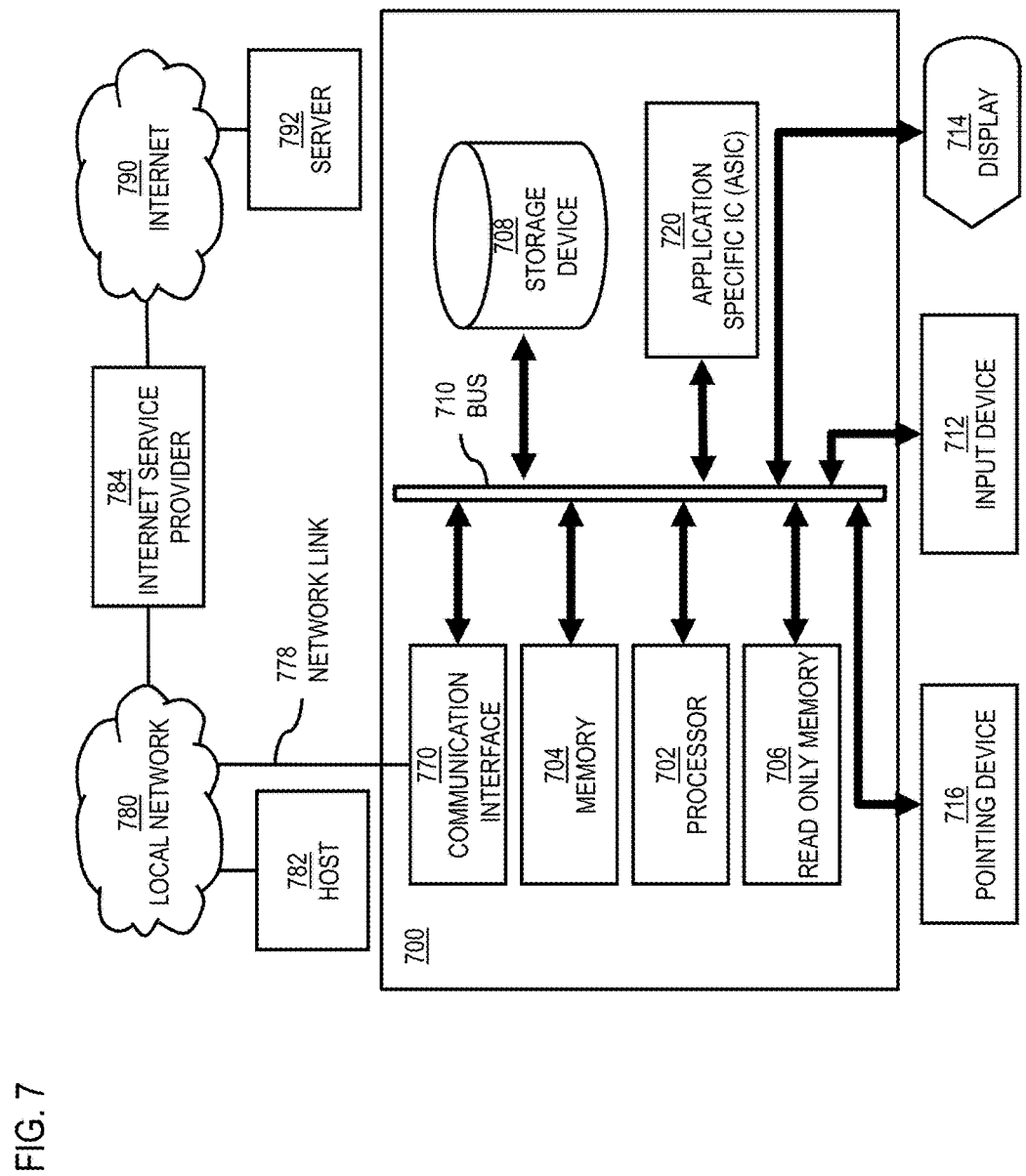
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide a navigation route as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing a navigation route.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to provide a navigation route. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for providing a navigation route. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing a navigation route, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing a navigation route to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide a navigation route as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing a navigation route.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide a navigation route. The memory 805 also stores the data associated with or generated by the execution of the inventive steps.

Figure 9:
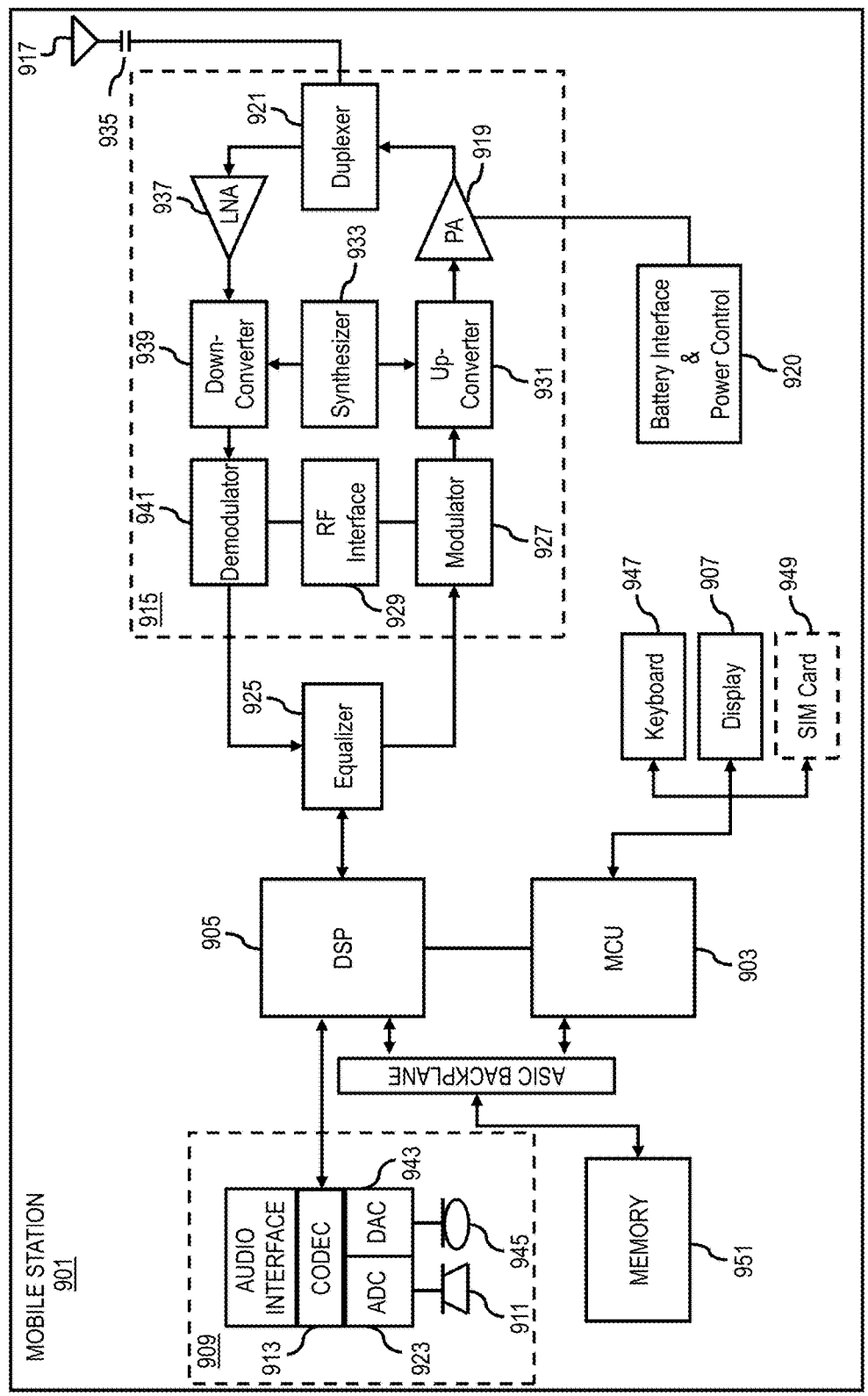
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of provide a navigation route. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing a navigation route. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide a navigation route. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for providing a navigation route, the method comprising:
   determining, utilizing at least one processor, a plurality of candidate navigation routes associated with a current connection that includes a starting point and a destination;
   applying at least one prize factor to a plurality of variables used for evaluating the plurality of candidate navigation routes,
      wherein the plurality of variables includes, at least in part, a total duration variable that represents a shortest time difference between a departure time and an arrival time for travel between the starting point and the destination of the current connection;
   applying at least one penalty factor to a transfer variable in the plurality of variables, wherein the transfer variable represents a number of transfers associated with travel between the starting point and the destination of the current connection;
   determining weighting information for the plurality of candidate navigation routes based, at least in part, on the applying of the at least one prize factor and the at least one penalty factor; and
   selecting for or recommending to a user of a mobile device at least one navigation route from among the plurality of candidate navigation routes based, at least in part, on the determined weighting information,
      wherein the applying of the at least one prize factor, the applying of the at least one penalty factor or a combination thereof is/are offset, at least in part, with respect to a last and/or a first segment of each respective candidate navigation route in the plurality of candidate navigation routes.

2. A method of claim 1,
   wherein at least one candidate navigation route of the plurality of candidate navigation routes involves multiple connections, multiple transfers, multiple modes of transportation or a combination thereof.

3. A method of claim 1,
   wherein determining the weighting information includes assigning a preference for selecting a candidate navigation route having fewer transfers in the last and/or first segment of the respective candidate navigation route.

4. A method of claim 1,
   wherein determining the weighting information includes a balancing of a desired departure time, a desired trip duration, a desired arrival time, or a combination thereof.

5. A method of claim 1, further comprising:
   prioritizing at least one first segment, at least one last segment, or a combination thereof of at least one of the plurality of candidate navigation routes for the determining the weighting information, selecting the at least one navigation route or a combination thereof.

6. A method of claim 5, further comprising:
determining the prioritizing based, at least in part, on whether the at least one first segment, the at least one last segment, or a combination thereof are below a duration threshold value.

7. A method of claim 5, further comprising:
determining the prioritizing based, at least in part, on whether the at least one first segment, the at least one last segment, or combination thereof includes at least one user preferred means of transport.

8. A method of claim 7, wherein the at least one user preferred means of transport includes, at least part, a walking means of transport.

9. A method of claim 1, wherein the plurality of candidate navigation routes, the selected at least one navigation route, or combination thereof include, at least in part, one or more public transit routes.

10. The method according to claim 1, wherein the at least one prize factor is further based in part on real-time information, or historical information.

11. The method according to claim 1, comprising:
selecting for or recommending to the user of the mobile device, the at least one navigation route, either manually or automatically through machine learning.

12. An apparatus for providing a navigation route, the apparatus comprising:
at least one processor; and
at least one memory including computer program code for one or more programs, the at least one memory and the computer program code configured to, with the at least one processor, cause the apparatus to perform at least the following,
determine, utilizing the at least one processor, a plurality of candidate navigation routes associated with a current connection that includes a starting point and a destination,
apply at least one prize factor to a plurality of variables used for evaluating the plurality of candidate navigation routes,
wherein the plurality of variables includes, at least in part, a total duration variable that represents a shortest time difference between a departure time and an arrival time for travel between the starting point and the destination of the current connection,
apply at least one penalty factor to a transfer variable in the plurality of variables, wherein the transfer variable represents a number of transfers associated with travel between the starting point and the destination of the current connection,
determine weighting information for the plurality of candidate navigation routes based, at least in part, on the applying of the at least one prize factor and the at least one penalty factor, and
select for or recommending to a user of a mobile device at least one navigation route from among the plurality of candidate navigation routes based, at least in part, on the determined weighting information,
wherein the application of the at least one prize factor, the applying of the at least one penalty factor or a combination thereof is/are offset, at least in part, with respect to a last and/or a first segment of each respective candidate navigation route in the plurality of candidate navigation routes.

13. An apparatus of claim 12, wherein at least one candidate navigation route of the plurality of candidate navigation routes involves multiple connections, multiple transfers, multiple modes of transportation or a combination thereof.

14. An apparatus of claim 12,
wherein determining the weighting information includes assigning a preference for selecting a candidate navigation route having fewer transfers in the last and/or first segment of the respective candidate navigation route.

15. An apparatus of claim 12,
wherein determining the weighting information includes a balancing of a desired departure time, a desired trip duration, a desired arrival time, or a combination thereof.

16. An apparatus of claim 12, the apparatus being further caused to:
prioritize at least one first segment, at least one last segment, or a combination thereof of at least one of the plurality of candidate navigation routes for the determining the weighting information, selecting the at least one navigation route or a combination thereof.

17. An apparatus of claim 16, the apparatus being further caused to:
determine the prioritizing based, at least in part, on whether the at least one first segment, the at least one last segment, or a combination thereof are below a duration threshold value.

18. The apparatus according to claim 12, wherein the at least one prize factor is further based in part on real-time information, or historical information.

19. A non-transient computer-readable storage medium for providing a navigation route, the medium carrying one or more sequences of one or more instructions which, when executed by one or more processors, cause an apparatus to at least perform the following steps:
determining, utilizing the one or more processors, a plurality of candidate navigation routes associated with a current connection that includes a starting point and a destination,
applying at least one prize factor to a plurality of variables used for evaluating the plurality of candidate navigation routes,
wherein the plurality of variables includes, at least in part, a total duration variable that represents a shortest time difference between a departure time and an arrival time for travel between the starting point and the destination of the current connection,
applying at least one penalty factor to a transfer variable in the plurality of variables, wherein the transfer variable represents a number of transfers associated with travel between the starting point and the destination of the current connection,
determining weighting information for the plurality of candidate navigation routes based, at least in part, on the applying of the at least one prize factor and the at least one penalty factor, and
selecting for or recommending to a user of a mobile device at least one navigation route from among the plurality of candidate navigation routes based, at least in part, on the determined weighting information
wherein the applying of the at least one prize factor, the applying of the at least one penalty factor or a combination thereof is/are offset, at least in part, with respect to a last and/or a first segment of each respective candidate navigation route in the plurality of candidate navigation routes.

20. A computer-readable storage medium of claim 19, wherein at least one candidate navigation route of the plurality of candidate navigation routes involves multiple connections, multiple transfers, multiple modes of transportation or a combination thereof.

21. The computer-readable storage medium according to claim 19, wherein the at least one prize factor is further based in part on real-time information, or historical information.

\* \* \* \* \*